United States Patent [19]
Wendland

[11] 4,332,469
[45] Jun. 1, 1982

[54] OPTICAL MULTIMETER

[75] Inventor: Paul H. Wendland, Los Angeles, Calif.

[73] Assignee: Photodyne, Inc., Newbury Park, Calif.

[21] Appl. No.: 130,463

[22] Filed: Mar. 14, 1980

[51] Int. Cl.³ .......................... G01J 1/42; G01N 21/01
[52] U.S. Cl. .................................... 356/222; 356/73.1; 356/223
[58] Field of Search ............... 356/222, 223, 224, 229, 356/73.1; 354/24

[56] References Cited
U.S. PATENT DOCUMENTS 3,651,252  3/1972  Land et al. ........................... 356/229
4,309,105  1/1982  Lebouska ........................... 356/73.1

Primary Examiner—John K. Corbin
Assistant Examiner—Bruce Y. Arnold
Attorney, Agent, or Firm—Marvin H. Kleinberg

[57] ABSTRACT

An improved light intensity measuring device includes a temperature compensating logarithmic amplifier that changes photodetector currents which have been converted from AC to DC to a voltage which drives an analog to digital converter. The resulting digital signals are displayed. For differential or absolute measurements, a second, identical, logarithmic amplifier channel is employed and both are coupled to a differential amplifier. A standard reference current applied to one channel provides an "absolute" measurement of the signal applied to the other channel or a second signal may be compared to the first.

18 Claims, 4 Drawing Figures

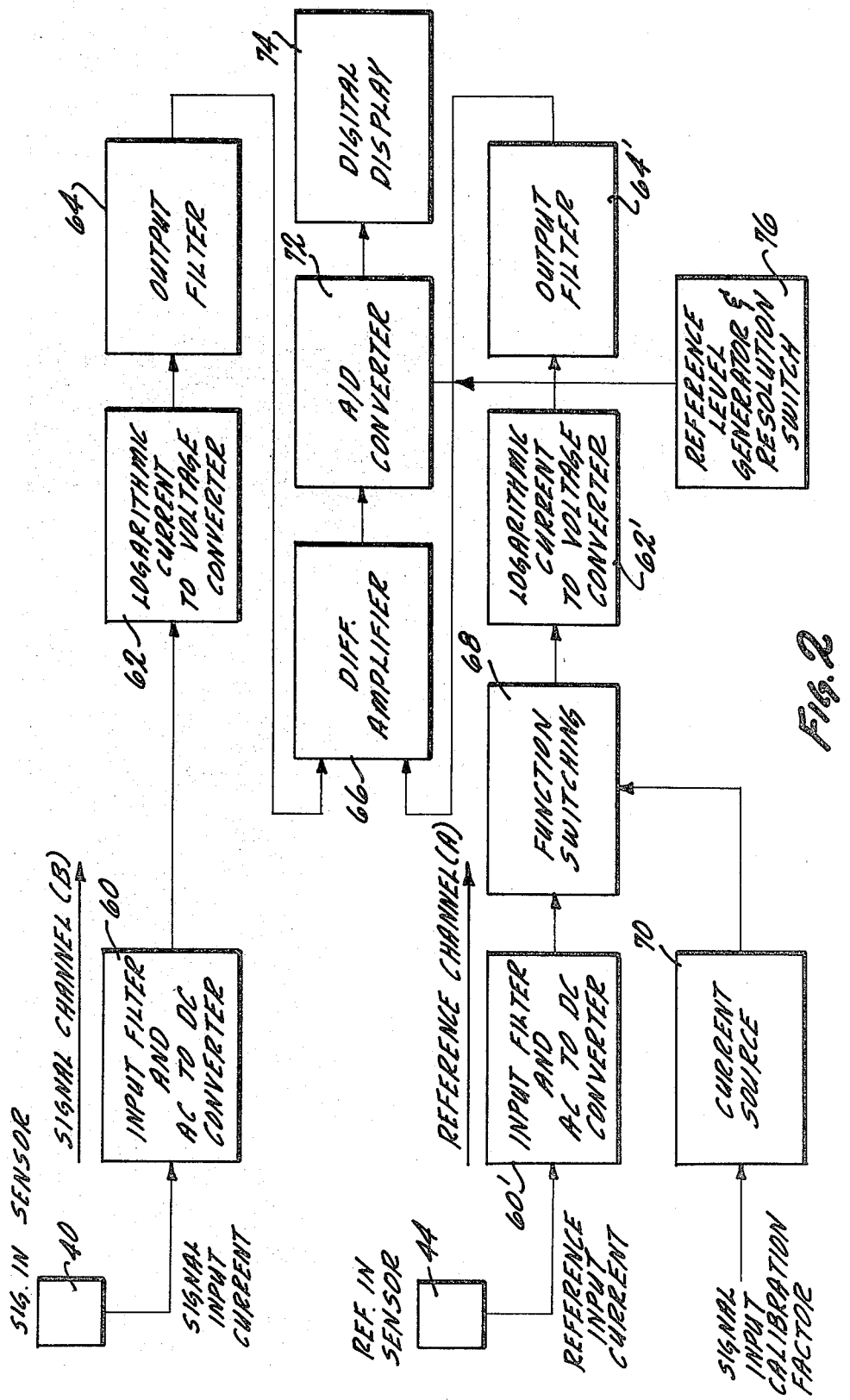

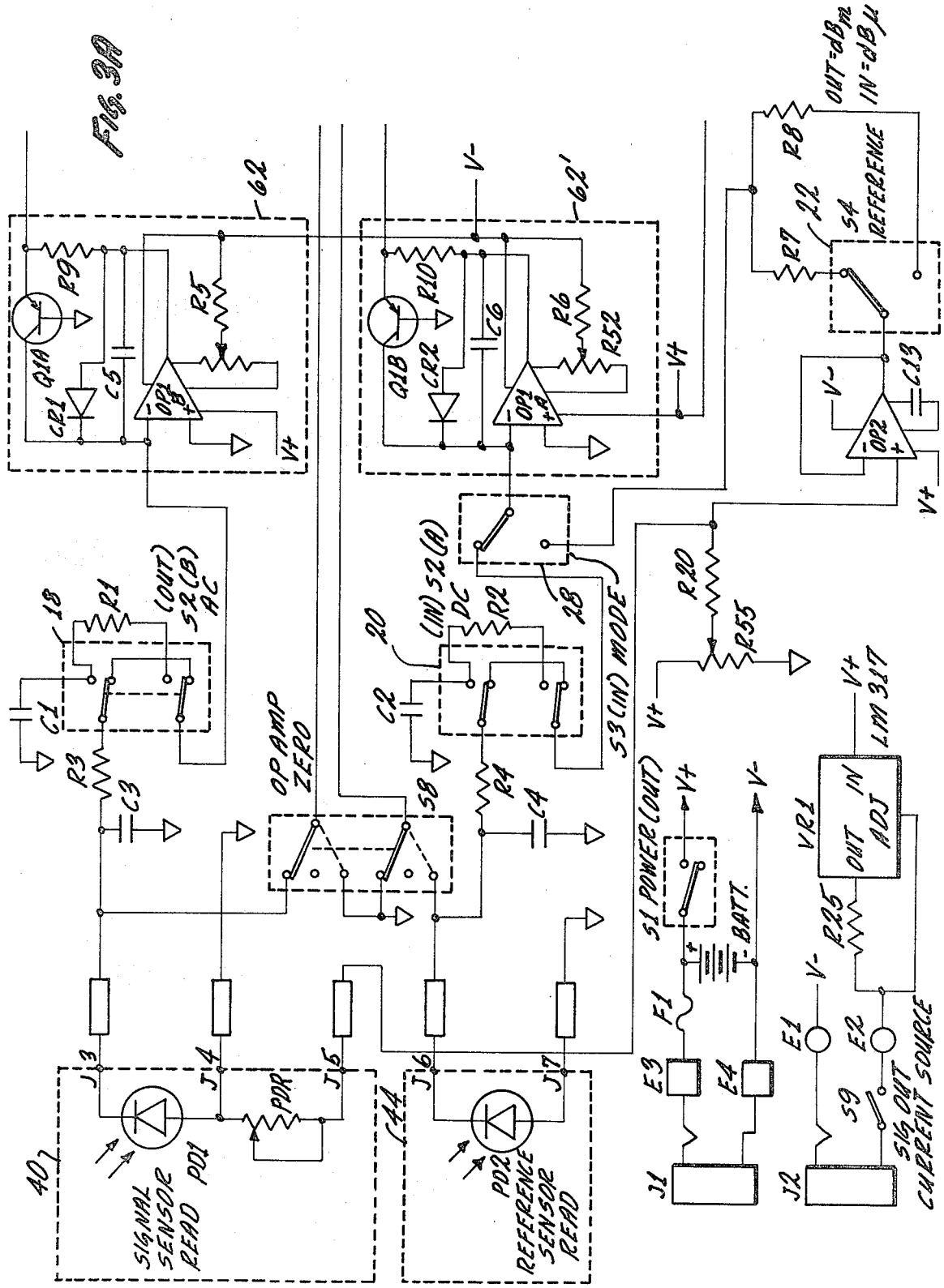

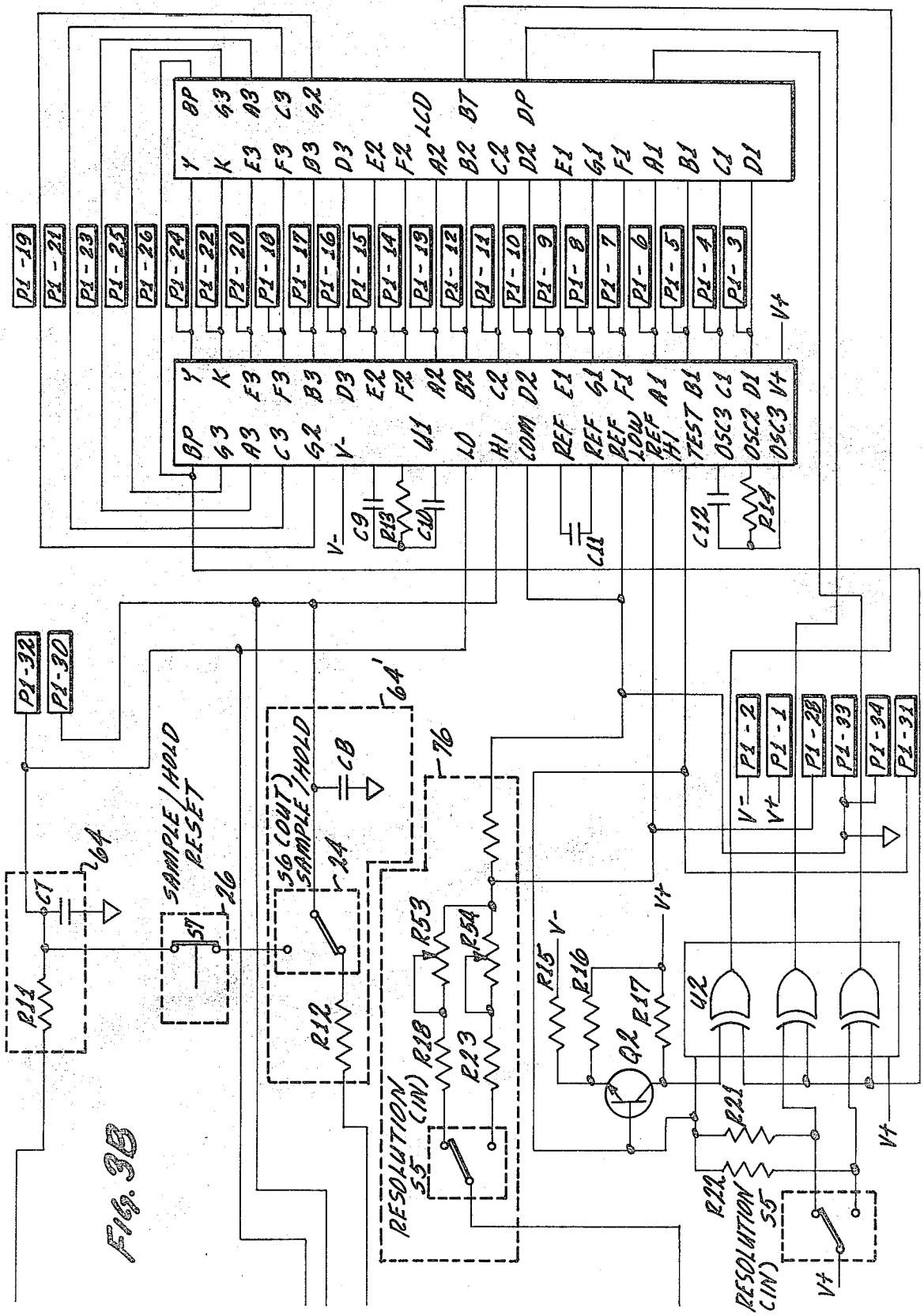

OPTICAL MULTIMETER

BACKGROUND OF THE INVENTION

1. Field of Invention

The present invention relates to measuring instruments and more particularly, to an improved instrument for measuring optical radiation power which is capable of making absolute or relative measurements and for providing results either with a visible digital display or with analog or digital signals suitable for application to other instruments or systems.

In recent years, greater use has been made of fiber optics for high speed transmission of information using light as the signal carrier. Optical radiation at the frequencies normally employed utilizes sources whose wavelengths range from under 400 nanometers through 1,200 nanometers in typical applications. These high frequencies permit information rates substantially greater than can be employed using the normal electromagnetic spectrum ranging through microwaves.

Accordingly, the need has arisen for better instruments that can be employed to measure the relatively low levels of light energy such as are used in fiber optics communications. Further, it useful to be able to measure all aspects of a fiber optic system, including light sources and emitters, photoreceivers, the transmission of fiber cables, and the losses that can be encountered through connectors or splices.

2. Description of the Prior Art

The instruments available to measure light intensity have classically been linear amplifying devices such as radiometers, photometers of power meters. These instruments most often functioned as linear current measuring instruments, i.e., recording and displaying the currents from photosensors. As light levels change, it was necessary to change the scale setting in such instruments. Their output was in units of optical power, such as watts, mwatt, $\mu$watt, nwatt, picowatt.

These prior art instruments have also been used for measuring light power in fiber optic systems. However, the most common unit for fiber optic measurements is not based on the watt or milliwatt, but the dBm (decibel milliwatt). Therefore, the measurements provided by linearly responding, prior art, power meters were not immediately useful. A mathematical conversion to a decibel reading was invariably necessary. In addition, the signal levels from fiber optic systems can vary over at least nine decades. Thus the scale settings of these linear reading prior art instruments might be required to be changed up to nine times during a measurement cycle. Further, such instruments measure only one signal at a time, and fiber optic systems often require that two signals be simultaneously measured, as from a fiber optic "T"-coupler or "star" coupler. For these measurements with prior art instrumentation, two instruments were required.

3. Summary of Invention

According to the present invention, all of these deficiencies of prior art fiber optic power measuring instruments have been overcome. The instrument of the present invention reads out directly in decibel units. It requires no range switching, yet covers a nine decade measurement range (90 dB), from 1 picowatt ($-90$ dBm) to 1 milliwatt (0 dBm) of optical power. It can measure one optical signal power level in absolute units (dBm or dB$\mu$), or measure and compare two signal power levels (dB) simultaneously.

As noted above, optical radiation power is generally measured in units of watts, but the art has adopted the convention of expressing power in decibels (dB) according to the following formula:

$$dB = 10 \log (P_{sig}/P_{ref}) \quad \text{(Equation 1)}$$

In Equation 1, $P_{sig}$ is the power to be measured and $P_{ref}$ represents the power of a known source. If the reference source is one milliwatt, then Equation 1 becomes:

$$dBm = 10 \log (P_{sig}/1 \text{ mw}) \quad \text{(Equation 2)}$$

For even lower levels of power, the reference source might be as small as one microwatt, resulting in the following equation:

$$dBm\mu = 10 \log (P_{sig}/1 \text{ }\mu w) \quad \text{(Equation 3)}$$

Of course, if a reference is not available and, instead, both signals are unknown, then the power measured would be the log ratio of the two input signals, expressed in decibels (dB).

By utilizing an internal calibrated current reference source corresponding either to one milliwatt or one microwatt, an unknown source of optical power can be measured and expressed in terms of absolute units of either decibel milliwatts (dBm) or decibel microwatts (dB$\mu$). When both channels are utilized, then the optical power applied to the two channels is compared and a readout in "relative" units of decibels (dB) can be displayed.

Should it be necessary to express a decibel measurement in watts, the following equation can be derived from Equation 1:

$$P_{sig}/P_{ref} = 10^{dB/10} \quad \text{(Equation 4)}$$

The instrument of the present invention is also provided with a sample-hold circuit which enables a subsequent measurement to be compared to an earlier measurement. The difference can be displayed in relative units of decibels. This would be useful in, for example, determining the loss attributable to a coupling. The transmitted optical power of a fiber optic line is measured first with and then without the coupling, and the difference displayed.

In prior art systems, as described above, the output of a photodetector is generally applied to a preamplifier which converts AC to DC as part of a feedback loop. A separate, second stage linear amplifier which includes temperature compensation resistors, is then employed.

If a second, substantially identical signal channel is used, differential measurements can be made if both are connected to a differential amplifier. The resultant output signal can then be processed to provide a display.

According to the present invention, a logarithmic amplifier is utilized which includes a non-linear element such as a transistor in the feedback loop. A direct readout in the desired dB units is then achieved. Further, the conventional approach, which uses a second stage linear amplifier with temperature compensating resistors cannot be employed, since the log of the average of the signal is not equal to the average of the log. Only by using conventional amplifiers and substantially linear feedback elements is the log of the average equal to the average of the log.

According to the present invention, a special resistive element with a positive temperature coefficient is utilized in a differential mode for temperature compensation. The output signal of the logarithmic amplifier is applied to an analog-to-digital converter which, in turn, drives the digital display. The difference between the output of a first channel and the output of a second, identical channel is then divided by the temperature compensating voltage. This, in effect, compensates both channels. The transistors in the feedback loops of the logarithmic amplifiers must be suitably matched. The temperature compensating resistor is then selected to have the identical temperature coefficient.

The use of this simple temperature compensation circuit facilitates the utilization of an analog to digital converter for a direct digital readout. Without temperature compensation, an inaccurate reading would result.

Absolute light level readings can be taken by generating an internal electrical current that is applied to one of the channels as though it were a photodetector output. This internal reference will then be temperature compensated to the same extent as the incoming signal, and will be treated as though it were a light input of known magnitude. Alternatively, a precisely calibrated light source of known intensity can be applied to the reference channel and compared to the unknown signal.

A power source is also provided to energize a standard optical source of known intensity for calibrating photodetectors whose response characteristics have not been accurately determined.

The use of logarithmic amplifiers also enables a single instrument to operate over a substantially greater range of intensities. Signal levels from one picowatt have been measured, representing −90 dBm. In the preferred embodiment, nine decades of intensity can be accommodated with either milliwatt or microwatt measurements and 0.1 dB resolution. Alternatively, four decades can be measured if 0.01 dB resolution is desired.

Other novel features which are believed to be characteristic of the invention, both as to organization and method of operation, together with further objects and advantages thereof, will be better understood from the following description considered in connection with the accompanying drawings in which several preferred embodiments of the invention are illustrated by way of example. It is to be understood, however, that the drawings are for the purpose of illustration and description only, and are not intended as a definition of the limits of the invention.

BRIEF DESCRIPTION OF THE DRAWINGS

FIG. 2 is a block diagram of a preferred embodiment of the present invention; and FIGS. 3A and 3B are a generalized circuit diagram of a preferred embodiment of the present invention.

Figure 1:
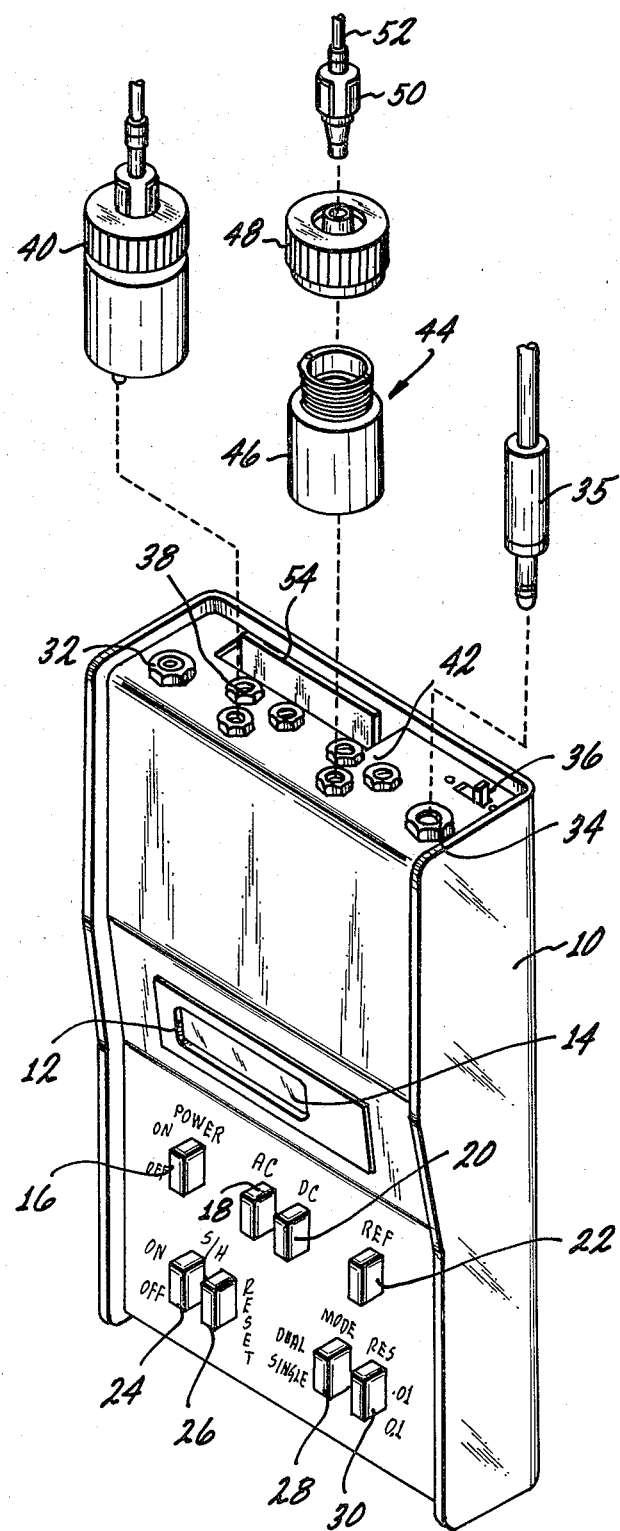
FIG. 1 is a perspective view of a preferred embodiment of an instrument according to the present invention, indicating the various controls as well as the possible inputs that may be employed.

Turning first to FIG. 1, there is shown a multimeter 10 according to the present invention. A window 12 surrounds a digital display 14, which provides a numerical representation of the quantities measured.

A number of push-type switches are placed on the front of the instrument to determine its operation. A first, POWER switch 16 connects the operating elements of the system to its self-contained internal power supply (not shown). In the preferred embodiment, the switches have two positions, either "in" or "out." When the POWER switch 16 is "in," the power is "on."

A pair of interlocked, push-button switches are labelled respectively AC 18 and DC 20. Depressing the AC switch 18 insures that the DC switch 20 is not depressed and permits average AC power measurements at frequencies between 100 Hz and 1.0 MHz. For higher AC frequencies, a correct reading will be provided whether the AC switch 18 or the DC switch 20 is depressed. For DC optical sources, the DC switch 20 should be depressed for proper operation.

To enable absolute measurements when operating in a single mode, that is, utilizing only one input sensor, one of two internal reference sources can be alternatively selected. The selection is accomplished by use of the REFERENCE switch 22 which, when depressed, selects a microwatt source providing a readout in decibel microwatts (dBµ). When the REFERENCE switch 22 is not depressed, the internal milliwatt source is selected, resulting in readouts of decibel milliwatts (dBm).

Internal SAMPLE and hold circuitry can be enabled through the use of a SAMPLE/HOLD on-off switch 24. A RESET push button 26 is also provided. Depressing the RESET push button 26 stores the input signal from a sensor in an internal storage circuit. Subsequent measurements are then compared to this stored value. At any later time, the stored value can be changed by again depressing the RESET button 26.

A MODE switch 28 permits the selection of a single input operation which displays the power received by a single sensor. These measurements are compared to the internal reference standard and can be expressed in absolute units of measurement. When the MODE button 28 is depressed, the instrument operates in a dual mode comparing one channel with another to provide ratiometric measurements in relative decibels. Here both input sensors are active.

A RESOLUTION push button switch 30 permits measurements in increments of either one-tenth of a dB (0.1) with the RESOLUTION switch 30 "out" or in one-hundredths of a dB (0.01), with the RESOLUTION switch 30 in. By utilizing the more precise resolution, the automatic ranging capability is, of course, limited to fewer decades.

Noting now the end of the instrument, there is provided a recharging socket 32 into which an appropriate recharging jack can be inserted to furnish external power to the unit or to harge the internal power supply. The internal power supply can be utilized to supply a nominal 25 milliamps of power to an external device such as a reference light source through a socket 34 which is controlled by an ON/OFF switch 34.

A group of input sockets 38 are provided for a SIGNAL IN input sensor head 40. A second group of reference input sockets 42 is adapted to receive a REFERENCE sensor head 44. A typical sensor head is shown in an exploded view and includes the head base 46 which include an integral optical detector and calibrating elements. A threaded collar 48 is adapted to connect to the connector 50 normally found on a fiber optic cable 52. Since many connectors are commercially available, an adapter 48 is provided for each type and different adapters 48 can be used interchangeably with the same sensor head.

When used in SINGLE mode, with the MODE switch 28 out, the optical power coming into the SIG- NAL IN sensor 40 is compared against an internal current reference source, corresponding to 1 mw or 1 uw, as determined by the position of REFERENCE switch 22. The instrument then reads out in absolute units of dBm or dBu. If in the DUAL mode, with the MODE switch 28 depressed, the optical power coming into the SIGNAL IN sensor 40 is compared to the optical power coming into the REFERENCE IN sensor 44, and the instrument reads out in relative units of dB.

The SAMPLE/HOLD circuits operate in the single sensor mode, but the instrument does not read out in absolute units. Instead, the optical power coming into the SIGNAL IN sensor 40 is compared against the SIGNAL IN reference signal that was sampled by the last activation of the RESET button 26, and the instrument reads out in relative units of dB.

Before any measurement is performed, the proper response mode should be selected. These options are represented by the two interlocked switches, DC (S2A) 20 and AC (S2B) 18. The instrument does not separate AC and DC signals. Average AC power measurements between 100 Hz and 1 MHz are correctly indicated only with the AC pushbutton 18 "in," although a reading will appear on the DC range. AC frequencies above 1 MHz will be correctly indicated on both AC and DC ranges.

Silicon and germanium photodiodes, in socket-mounted assemblies, are the basic sensors. A calibration capability is contained within each sensor head and the calibration is transferred to the electronics upon insertion. A wide range of sensor heads are available from the assignee of the invention to match the spectral and optical power characteristics of any specific application.

Fiber optic cable 52 and connectors attach with threaded adaptors 50 to the sensors. The pins on the bottom of each sensor head are arranged to prevent incorrect insertion of the head into the instrument. These connectors 38, 42, located on the rear panel of the instrument, form a triangle of 3, color-coded miniature banana sockets—black, red, and green. Depending upon the mode of operation, sensor heads are plugged into the SIG IN sockets 38 (SINGLE, DUAL, and SAMPLE/HOLD modes) and the REF in sockets 42 (DUAL mode only).

The instrument provides an internal, current regulated output source to a miniature phone jack 35 from the SIG OUT (J2) connector 34 which provides a nominal 25 ma electrical output. Control of this source is provided by the SIG OUT ON/OFF switch (S9) 36 located below the output receptacle 34 located on the rear panel. It should be noted that extended use of this source significantly shortens the operating life of the internal power supply until recharging is required.

Turning next to FIG. 2, the block diagram of the instrument gives a general guide to the organization of the instrument according to the preferred embodiment of the invention. The sensor heads 40, 44 convert impinging light into an electrical current. The electronics amplify and convert the sensor head signal current into a digital display.

The electronic elements corresponding to the block diagram of FIG. 2 are all arranged on a single board, including battery, switches and display. This board is operational even when removed from the case. However, low signal level performance is lost without the shielding provided by the metal case.

Circuitry for the instrument 10 is divided into two parts; (1) two-channel amplification, conversion and display of sensor signal currents; and (2) a constant current output generator for driving plug-in LEDs (not shown). The typical photodetector sensor generates a current in response to a light input. This current is applied to an INPUT FILTER AND AC TO DC CONVERTER circuit 60. The resulting DC current is then applied to a LOGARITHMIC CURRENT TO VOLTAGE AMPLIFIER converter 62 which provides an output voltage representative of the log of the intensity of the impinging radiation. The voltage signal is then applied to an output filter 64 and to one input of a differential amplifier 66.

A second, substantially identical channel is provided for the reference signal. The REF IN sensor 44 is applied to an INPUT FILTER AND AC TO DC CONVERTER 60' and the output is applied to a FUNCTION SWITCHING circuit 68. A second input to the FUNCTION SWITCHING circuit 68 comes from a CURRENT SOURCE 70 which, in an appropriate mode, would be used in place of a signal from the REF IN sensor 44. The output of the FUNCTION SWITCHING circuit 68 is applied to a second LOGARITHMIC CURRENT TO VOLTAGE CONVERTER 62' and then to an OUTPUT FILTER 64'.

The voltage signal from the reference channel OUTPUT FILTER 64' is applied to the second input of the differential amplifier 66. The output or difference signal is then applied directly to an ANALOG-TO-DIGITAL CONVERTER 72 which drives a DIGITAL DISPLAY 74.

To properly condition the ANALOG-TO-DIGITAL CONVERTER 72 signal for the DIGITAL DISPLAY 74, a REFERENCE LEVEL GENERATOR AND RESOLUTION switch 76 is provided.

Turning next to FIG. 3, the elements of FIG. 2 are shown in greater detail. The signal input current from the SIG IN sensor head 40 is applied to the AC to DC passive current converter portion of INPUT FILTER and AC TO DC CONVERTER network 60 for the SIGNAL CHANNEL (B) channel which is formed by resistor R3 and capacitor C3 if in the DC mode, and resistor R1, and capacitor C1 in the AC mode.

Transistor Q1 A and amplifier OP-1 B and their associated passive components form the LOGARITHMIC CURRENT TO VOLTAGE CONVERTER 62 of channel B. Resistor R11 and capacitor C7 form the OUTPUT FILTER 64.

The differential amplifier 66, analog-to-digital converter 72 and digital display driver functions are all contained within a single, integrated circuit unit U-1 80. This unit can be part No. 1100-1CL7106, commercially available from the assignee of the present invention.

Similarly, the reference channel A includes comparable elements of the reference input current from the REF.IN sensor head 44 is applied to the INPUT FILTER and AC to DC converter network 60' including resistor R4 and capacitor C4 (in the DC mode), and resistor R2, and capacitor C2 (in the AC mode).

The function switching is accomplished by MODE switch 28 (S3) and REFERENCE switch 22 (S4). When the MODE switch 28 is "out" (SINGLE MODE), a calibrated current source is injected into the REFERENCE CHANNEL LOGARITHMIC CURRENT TO VOLTAGE CONVERTER 62'. This current source is conditioned by a trimpot (PDR) on the SIG.IN sensor head 40 to provide a current reference, which results in a direct dBm or dBμ reading on the display.

If the SIG.IN calibrating terminal is left open, the current source 70 provides a constant reference of 1 ma or 1 ua, depending on the position of the REFERENCE switch 22 (S4). This current source is comprised of operational amplifier OP-2 and resistors R55, R20, R7, R8, and capacitor C13. When the MODE switch 28 (S3) is in DUAL MODE position, the signal current from the REFERENCE Sensor Head 44 is directed into the Reference Channel (A) LOGARITHMIC CURRENT TO VOLTAGE CONVERTER 62'. This converter is comprised of transistor Q1 B, amplifier OP-1A and their associated passive components. The Reference Channel OUTPUT FILTER 64' is comprised of resistor R12 and capacitor C8.

SAMPLE/HOLD switch 24 (S6) and the RESET switch 26 (S7) control the sample and hold manner of operation. When the SAMPLE/HOLD switch 24 (S6) is "in," the Reference Channel A is disconnected from the differential amplifier 66. When the RESET button 26 (S7) is pushed in momentarily, a reference level is established as that existing on the SIGNAL channel B at the time. This voltage is held on capacitor C8, and is the reference level to which later readings of the SIG.IN sensor current are related.

The REFERENCE LEVEL GENERATOR AND SWITCH 76 is comprised of RESOLUTION switch 30 (S5) and resistors R53, R54, R18, R23, and the temperature compensating resistor RTC. This function calibrates the instrument for a precise 10 dB per decade reading, with either 0.1 or 0.01 dB resolution, depending on the position of RESOLUTION switch 30 (S5). The compensating resistor RTC has a temperature coefficient that is matched to be identical to the temperature-coefficient of the transistors Q1A and Q1B of the logarithmic current to voltage converters 62, 62'. Because the resistor is used in a differential connection, it corrects for the temperature coefficient of each transistor in the logarithmic amplifiers and renders the combination substantially temperature insensitive.

Thus, there has been shown in some detail a new optical radiant energy measuring device which is designed for reliability, portability and accuracy over a wide measurement range. This instrument according to the present invention is specifically intended to be used as an optical power measuring device and has its greatest utility in fiber optic and electro-optic measurements.

A pair of logarithmic current-to-voltage converting amplifiers are used to generate a signal representative of the current produced by impinging radiation on a conventional photodetector and the output can be directly expressed in decibels.

By utilizing a dual channel device with internal precision current sources, with the internal sources connected to one of the channels, the second channel can be used to provide a signal representative of absolute power, in the preferred embodiment expressed either in decibel milliwatts (dBm) or decibel microwatts (dBμ).

To enable the use of logarithmic amplifiers which include non-linear elements such as transistors in the feedback loops, a novel temperature correction system has been devised. A resistive element having a temperature coefficient identical to that of the semiconductors in the logarithmic amplifier feedback loops is used in a differencing and ratioing connection, thereby rendering the instrument substantially insensitive to temperature changes.

The use of logarithmic amplifiers automatically provides a range of several decades without the need for switching to change range. Further, the availability of the two channels permits an unknown source to be compared either to a known source or an internal current of known magnitude for absolute power measurements expressed in decibels.

Yet an additional feature of the present invention is the provision of a sample hold circuit which enables a first reading to be compared with subsequent readings so that, for example, the power loss produced by a particular cable can be determined since measurements can be made both with and without the cable element.

The output of the logarithmic amplifier is applied through a differential amplifier which generates an analog voltage that is converted to a digital readout for providing a direct digital display. Alternatively, provision is made to supply analog signals to appropriate utilization devices, should that be deemed desirable.

As used herein and in the claims below, the term "watt units" shall be deemed to include any of the various multiples and submultiples of power units such as picowatts, nanowatts, microwatts, milliwatts, or the like. Similarly, the use of the term "units of optical power" shall be deemed to include any of the various scaled values of watts such as picowatts, nanowatts, microwatts, milliwatts or the like, inherent in a light beam. Other features will be noted by those skilled in the art and accordingly, the scope of the present invention should be limited only by the claims appended hereto.

What I claim as new is:

1. An optical radiant power measuring device comprising in combination:
    (1) means adapted to receive a first photo detector sensor head, the sensor head generating an electrical current related to the intensity of radiant power impinging upon it;
    (2) a logarithmic current to voltage amplifier for providing a voltage signal, including a semiconductor feedback loop, said amplifier coupled to said means; and
    (3) comparison means coupled to the output of said amplifier and to a reference current source representative of a reference radiant power level, whereby said comparison means provide an output signal corresponding to and representative of the ratio of radiant power impinging upon the photo detector sensor head to that of the reference radiant power level, expressed in decibel units of optical power.

2. The optical radiant power measuring device of claim 1 further comprising AC to DC conversion means interposed between said comparison means and said amplifier.

3. The optical radiant power measuring device of claim 1 further including temperature compensating means associated with said amplifier including resistive means having the same temperature coefficient as that of the semiconductor in said feedback loop and of a magnitude adequate to balance and compensate for the temperature coefficient of said semiconductor.

4. The optical measuring device of claim 1 further comprising analog to digital conversion means coupled to receive the output of said comparison means for generating a digital signal corresponding to and representative of the power of radiation impinging upon the photo detector, expressed in decibel units of optical power.

5. The optical radiant power measuring device of claim 1 wherein said reference source is an internal precision current source of predetermined magnitude whereby said comparison means provides an output signal corresponding to and representative of an absolute value of power impinging upon the photo detector expressed in decibel units of optical power.

6. The optical radiant power measuring device of claim 5 further including analog to digital converter means connected to receive the output of said comparison means and digital display means connected to analog to digital converter means to provide a digital display of the magnitude of power applied to the photo detector, expressed in decibel units of optical power.

7. An optical radiant power measuring device comprising in combination:
(1) first means adapted to receive a first photo detector sensor head and second means adapted to receive a second photo detector sensor head; each sensor head being of the type adapted to generate an electrical current related to the intensity of radiant power impinging upon it;
(2) first and second logarithmic, current to voltage converter-amplifiers, respectively coupled to first and second means; and
(3) differential amplifier means coupled to receive the logarithmic voltage output from said first and second amplifiers to provide a voltage signal corresponding to and representative of the logarithm of the ratio of radiant power applied to the first and second photo detectors, expressed in decibel units of optical power ratio.

8. The optical radiant power measuring device of claim 7 further comprising temperature compensating means coupled to said differential amplifier means.

9. The optical radiant power measuring device of claim 7 further comprising AC to DC conversion means interposed between each of said first and second means and said amplifiers.

10. The optical power measuring device of claim 7 including an internal precision current source for calibration and comparison, and means for coupling said source to one of said logarithmic amplifiers for producing, at said differential amplifier means output, a signal representing an absolute value of radiant power applied through the other of said logarithmic amplifiers, expressed in decibel watt units of optical power.

11. The optical power measuring device of claim 7 further including analog to digital converting means coupled to receive the output of said differential amplifier for driving a digital display.

12. The optical power measuring device of claim 7 including sample and hold means coupled to one of said logarithmic amplifiers and said differential amplifier means for substituting a prior signal of said one logarithmic amplifier for said other logarithmic amplifier at one input of said differential amplifier to produce a signal representing the logarithm of the ratio of radiant optical power between a presently applied radiant source and a previously applied source.

13. An optical radiant power measuring device comprising in combination:
(1) first photo detector means and second photo detector means, each adapted to generate an electrical current related to the intensity of impinging radiant power upon the respective photo detector means;
(2) first and second logarithmic, current to voltage converter-amplifiers, respectively coupled to first and second photo detector means; and
(3) differential amplifier means coupled to receive the logarithmic voltage output from said first and second amplifiers to provide a voltage signal corresponding to and representative of the logarithm of the ratio of optical power applied to said first and second photo detector means, expressed in decibel units of optical power ratio.

14. The optical radiant power measuring device of claim 13 further comprising temperature compensating means coupled to said differential amplifier means.

15. The optical radiant power measuring device of claim 13 further comprising AC to DC conversion means interposed between each of said first and second photo detector means and said logarithmic amplifiers.

16. The optical power measuring device of claim 13 including an internal precision current source for calibration and comparison, and means for coupling said source to one of said logarithmic amplifiers for producing, at said differential amplifier means output, a signal representing an absolute value of radiant power applied through the other of said logarithmic amplifiers, expressed in decibel watt units of optical power.

17. The optical measuring device of claim 13 further including analog to digital converting means for driving a digital display coupled to receive said differential amplifier output.

18. The optical power measuring device of claim 13 including sample and hold means coupled to one of said logarithmic amplifiers and said differential amplifier means for substituting a prior signal of said one logarithmic amplifier for said other logarithmic amplifier at one input of said differential amplifier to produce a signal representing the logarithm of the ratio of optical power between a presently applied radiant source and a previously applied source.

* * * * *